United States Patent
Kwon et al.

(10) Patent No.: US 9,052,089 B2
(45) Date of Patent: Jun. 9, 2015

(54) DISPLAY PANEL HAVING A PIXEL ARRANGEMENT THAT PROVIDES A BROAD COLOR GAMUT, AND DISPLAY APPARATUS HAVING THE SAME

(71) Applicant: Samsung Display Co., Ltd., Yongin, Gyeonggi-do (KR)

(72) Inventors: Se Ah Kwon, Seoul (KR); Jai-Hyun Koh, Seoul (KR); Ik-Soo Lee, Seoul (KR); Kuk-Hwan Ahn, Hwaseong-si (KR)

(73) Assignee: SAMSUNG DISLAY CO., LTD., Yongin, Gyeonggi-Do (KR)

( * ) Notice: Subject to any disclaimer, the term of this patent is extended or adjusted under 35 U.S.C. 154(b) by 197 days.

(21) Appl. No.: 13/772,847

(22) Filed: Feb. 21, 2013

(65) Prior Publication Data

US 2014/0029250 A1    Jan. 30, 2014

(30) Foreign Application Priority Data

Jul. 24, 2012    (KR) .......... 10-2012-0080422

(51) Int. Cl.
G02F 1/1335    (2006.01)
F21V 9/10    (2006.01)
G09G 3/36    (2006.01)

(52) U.S. Cl.
CPC ............ *F21V 9/10* (2013.01); *G02F 1/133514* (2013.01); *G09G 3/3607* (2013.01); *G02F 2201/40* (2013.01); *G02F 2201/52* (2013.01)

(58) Field of Classification Search
CPC .................... G02F 1/133609; G02F 1/133514
USPC .......................................... 349/106, 108, 109
See application file for complete search history.

(56) References Cited

U.S. PATENT DOCUMENTS

| | | | |
|---|---|---|---|
| 7,580,093 B2 | 8/2009 | Rho | |
| 7,791,688 B2* | 9/2010 | Kuribayashi et al. | 349/106 |
| 7,876,339 B2* | 1/2011 | Okazaki et al. | 345/694 |
| 7,920,114 B2* | 4/2011 | Shiomi | 345/88 |
| 7,995,019 B2 | 8/2011 | Ben-David et al. | |

FOREIGN PATENT DOCUMENTS

| | | |
|---|---|---|
| JP | 2010-277095 | 12/2010 |
| KR | 1020110059167 | 6/2011 |

* cited by examiner

*Primary Examiner* — Paisley L Arendt
(74) *Attorney, Agent, or Firm* — F. Chau & Associates, LLC

(57) ABSTRACT

A display panel includes a pixel group having first through fourth pixels disposed in a two-by-two matrix form. Each of the first through fourth pixels includes at least three subpixels. The first and second pixels have the same subpixel layout. The third pixel has a different subpixel layout from the first pixel. The fourth pixel has a different subpixel layout from the first and third pixels.

21 Claims, 6 Drawing Sheets

US 9,052,089 B2

DISPLAY PANEL HAVING A PIXEL ARRANGEMENT THAT PROVIDES A BROAD COLOR GAMUT, AND DISPLAY APPARATUS HAVING THE SAME

CROSS-REFERENCE TO RELATED APPLICATION

This application claims priority under 35 U.S.C. §119 to Korean Patent Application No. 10-2012-0080422, filed on Jul. 24, 2012, the disclosure of which is incorporated by reference herein in its entirety.

TECHNICAL FIELD

Exemplary embodiments of the present invention relate to a display panel and a display apparatus including the display panel. More particularly, exemplary embodiments of the present invention relate to a display panel including subpixels having multiple primary colors, and a display apparatus including the display panel.

DISCUSSION OF THE RELATED ART

Generally, a display apparatus displays an image using subpixels having one of three primary colors. For example, a display apparatus may display an image using a display panel that includes red subpixels, green subpixels and blue subpixels.

However, the color gamut of a display that uses subpixels having one of three primary colors may be limited. For example, such a display apparatus may not sufficiently display a color gamut corresponding to the gamut of human vision.

A display apparatus that displays an image using subpixels having four or more primary colors may result in an improved color gamut. However, the resolution and aperture ratio of such a display apparatus may be decreased, resulting in a reduced display quality.

SUMMARY

Exemplary embodiments of the present invention provide a display panel having multiple primary colors, and capable of improving display quality.

Exemplary embodiments of the present invention also provide a display apparatus including the display panel.

According to an exemplary embodiment, a display panel includes a pixel group including a first pixel, a second pixel, a third pixel, and a fourth pixel. The first to fourth pixels are disposed in a two-by-two matrix form. Each of the first to fourth pixels includes at least three subpixels. A subpixel layout of the second pixel is the same as a subpixel layout of the first pixel. A subpixel layout of the third pixel is different from the subpixel layout of the first pixel. A subpixel layout of the fourth pixel is different from the subpixel layout of the first pixel and the subpixel layout of the third pixel.

According to an exemplary embodiment, a display apparatus includes a display panel and a display panel driver. The display panel includes a pixel group. The pixel group includes a first pixel, a second pixel, a third pixel and a fourth pixel. The display panel driver is operatively coupled to the display panel, and is configured to operate a subpixel rendering independently for subpixels of the display panel according to colors of the subpixels. The first to fourth pixels are disposed in a two-by-two matrix form. Each of the first to fourth pixels includes at least three subpixels of the display panel. A subpixel layout of the second pixel is the same as a subpixel layout of the first pixel. A subpixel layout of the third pixel is different from the subpixel layout of the first pixel. A subpixel layout of the fourth pixel is different from the subpixel layout of the first pixel and the subpixel layout of the third pixel.

According to an exemplary embodiment, a display panel includes a pixel including a first pixel, a second pixel, a third pixel, and a fourth pixel. Each of the first to fourth pixels includes at least three subpixels. The first to fourth pixels are disposed in a two-by-two matrix form. The first pixel and the second pixel are disposed in a diagonal direction in the two-by-two matrix form. The first pixel and the second pixel include the same subpixel layout, different from a subpixel layout of the third pixel and the fourth pixel.

According to exemplary embodiments, the display apparatus may represent a broader color gamut, and may prevent decreases of the resolution and aperture ratio of the display apparatus. Thus, the display quality of the display apparatus may be improved.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Hereinafter, exemplary embodiments of the present invention will be described in further detail with reference to the accompanying drawings.

Figure 1:
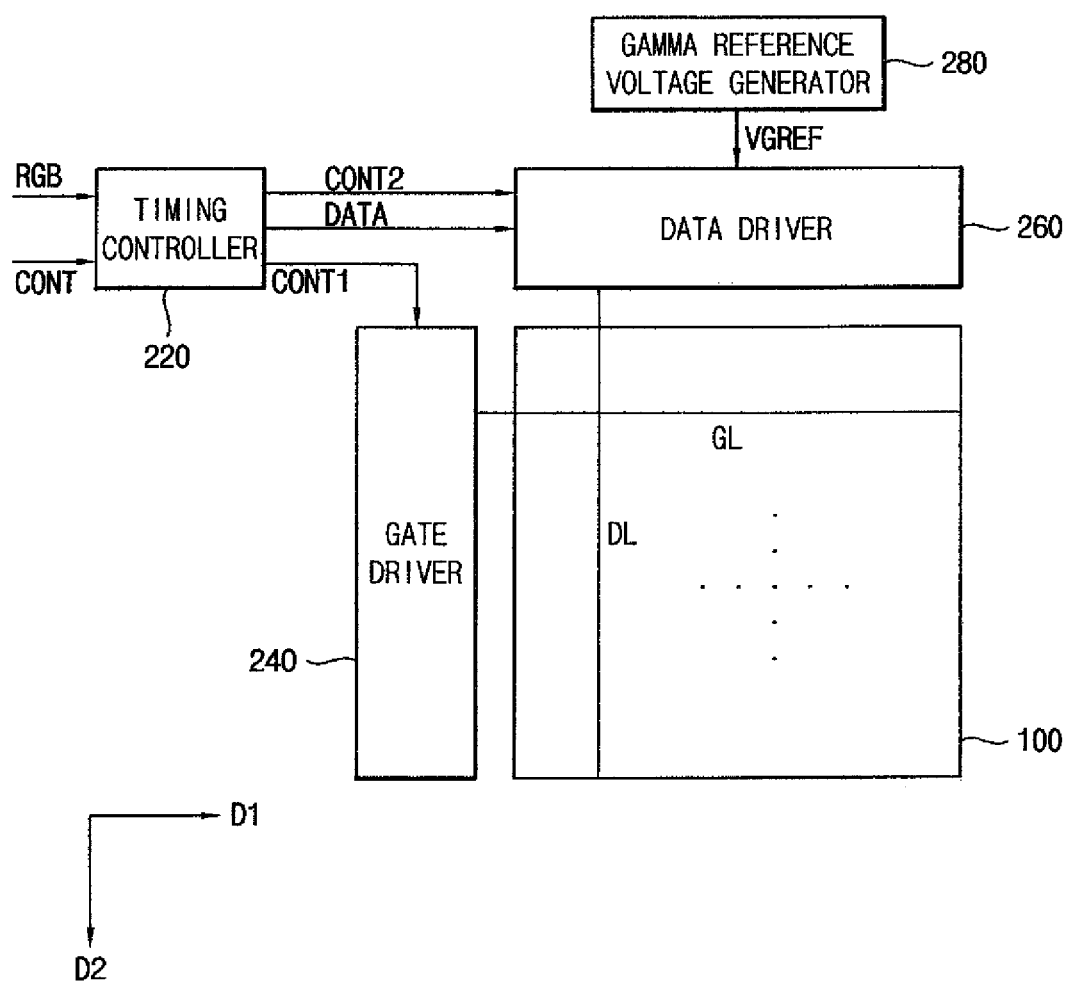
FIG. 1 is a block diagram illustrating a display apparatus according to an exemplary embodiment of the present invention.

FIG. 1 is a block diagram illustrating a display apparatus according to an exemplary embodiment of the present invention.

Referring to FIG. 1, the display apparatus includes a display panel 100 and a display panel driver.

The display panel 100 displays an image. The display panel 100 may include a first substrate, a second substrate facing the first substrate, and a liquid crystal layer disposed between the first and second substrates.

The display panel 100 includes a plurality of pixel groups. Each of the pixel groups includes a plurality of pixels. Each of the pixels includes a plurality of subpixels. A pixel structure of the display panel 100 is described in further detail with reference to FIGS. 2 and 4-11.

The display panel 100 includes a plurality of gate lines GL and a plurality of data lines DL. The subpixels are connected to the gate lines GL and the data lines DL. The gate lines GL extend in a first direction D1. The data lines DL extend in a second direction D2 crossing the first direction D1.

Each of the subpixels includes a switching element and a liquid crystal capacitor electrically connected to the switching element. Each of the subpixels may further include a storage capacitor. The subpixels are disposed in a matrix form. The switching element may be, for example, a thin film transistor.

The gate lines GL, the data lines DL, pixel electrodes and storage electrodes may be disposed on the first substrate. A common electrode may be disposed on the second substrate.

The display panel driver is connected to the display panel 100 and drives the display panel 100. The display panel driver includes a timing controller 220, a gate driver 240, a data driver 260 and a gamma reference voltage generator 280. The display panel driver operates a subpixel rendering independently for the subpixels according to colors of the subpixels on the display panel 100.

The timing controller 220 receives input image data RGB and an input control signal CONT from an external apparatus. The input image data RGB may include red image data R, green image data G and blue image data B. The input control signal CONT may include a master clock signal, a data enable signal, a vertical synchronizing signal and a horizontal synchronizing signal.

The timing controller 220 generates a first control signal CONT1, a second control signal CONT2 and a data signal DATA (e.g., grayscale data) based on the input image data RGB and the input control signal CONT.

The first control signal CONT1 controls a driving timing of the gate driver 240 based on the input control signal CONT. The first control signal CONT1 is output to the gate driver 240. The first control signal CONT1 may include, for example, a vertical start signal and a gate clock signal.

The second control signal CONT2 controls a driving timing of the data driver 260 based on the input control signal CONT. The second control signal CONT2 is output to the data driver 260. The second control signal CONT2 may include, for example, a horizontal start signal and a load signal.

The timing controller 220 generates the data signal DATA based on the input image data RGB, and outputs the data signal DATA to the data driver 260.

The gate driver 240 receives the first control signal CONT1 from the timing controller 220. The gate driver 240 generates gate signals for driving the gate lines GL in response to the first control signal CONT1. The gate driver 240 sequentially outputs the gate signals to the gate lines GL.

The gamma reference voltage generator 280 generates a gamma reference voltage VGREF. The gamma reference voltage generator 280 provides the gamma reference voltage VGREF to the data driver 260. The gamma reference voltage VGREF has values corresponding to the data signal DATA.

For example, the gamma reference voltage generator 280 may include a resistor string circuit having a plurality of resistors connected in series, and dividing a source voltage and a ground voltage to generate the gamma reference voltage VGREF. The gamma reference voltage generator 280 outputs the gamma reference voltage VGREF to the data driver 260. As shown in FIG. 1, the gamma reference voltage generator 280 may be disposed separate from the data driver 260, however exemplary embodiments are not limited thereto. For example, the gamma reference voltage generator 280 may be disposed in the data driver 260.

The data driver 260 receives the second control signal CONT2 and the data signal DATA from the timing controller 220, and the gamma reference voltage VGREF from the gamma reference voltage generator 280.

The data driver 260 converts the data signal DATA into analog data voltages using the gamma reference voltage VGREF. The data driver 260 outputs the data voltages to the data lines DL.

A structure of the display panel driver is described in further detail with reference to FIG. 3.

Figure 2:
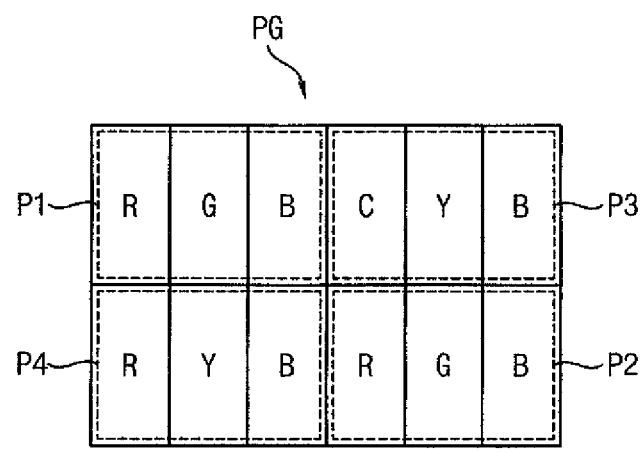
FIG. 2 is a plan view illustrating a pixel structure of the display panel of FIG. 1 according to an exemplary embodiment of the present invention.

FIG. 2 is a plan view illustrating a pixel structure of the display panel 100 of FIG. 1 according to an exemplary embodiment of the present invention.

Referring to FIGS. 1 and 2, in an exemplary embodiment, the display panel 100 includes a plurality of pixel groups PG. FIG. 2 illustrates a single pixel group PG. The display panel 100 includes a plurality of pixel groups PG disposed in a matrix form relative to the first direction D1 and the second direction D2.

In an exemplary embodiment, the pixel group PG includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes three or more subpixels. The subpixels in one pixel have different colors from one another. In the exemplary embodiment shown in FIG. 2, each of the first to fourth pixels P1 to P4 includes three subpixels. The subpixels may have substantially the same size as one another, however exemplary embodiments are not limited thereto.

In the exemplary embodiment shown in FIG. 2, the second pixel P2 has the same subpixel layout as the first pixel P1. The third pixel P3 has a subpixel layout different from the subpixel layout of the first pixel P1. The fourth pixel P4 has a subpixel layout different from the subpixel layout of the first pixel P1 and the third pixel P3.

Each of the first to fourth pixels P1 to P4 is capable of representing a white image and a black image. Each of the first to fourth pixels P1 to P4 includes a first primary color component, a second primary color component and a third primary color component. Each of the first to fourth pixels P1 to P4 is able to represent a white image and a black image using a combination of the first to third primary color components. For example, the first primary color component may be red, the second primary color component may be green, and the third primary color component may be blue.

In the exemplary embodiment shown in FIG. 2, the subpixels of the pixel group PG may have one of five primary colors. That is, the pixel group PG includes first to fifth subpixels having different colors from each other. Each of the first to fourth pixels P1 to P4 includes three of the first to fifth subpixels.

For example, the first subpixel may be a red subpixel R, the second subpixel may be a green subpixel G, the third subpixel may be a blue subpixel B, the fourth subpixel may be a cyan subpixel C, and the fifth subpixel may be a yellow subpixel Y.

The first subpixel R includes the first primary color component r, the second subpixel G includes the second primary color component g, the third subpixel B includes the third primary color component b, the fourth subpixel C includes the second and third primary color components g and b, and the fifth subpixel Y includes the first and second primary color components r and g.

A ratio between the second and third primary color components g and b in the fourth subpixel C may be substantially 1:1. A ratio between the first and second primary color components r and g in the fifth subpixel Y may be substantially 1:1.

In the exemplary embodiment shown in FIG. 2, the pixel group PG includes a total of twelve subpixels. Each of the first to fourth pixels includes three subpixels. The pixel group PG includes four third subpixels B, three first subpixels R, two second subpixels G, two fifth subpixels Y, and one fourth subpixel C.

For example, the first pixel P1 includes a red subpixel R, a green subpixel G and a blue subpixel B. The second pixel P2 includes a red subpixel R, a green subpixel G and a blue subpixel B. The third pixel P3 includes a cyan subpixel C, a yellow subpixel Y and a blue subpixel B. The fourth pixel P4 includes a red subpixel R, a yellow subpixel Y and a blue subpixel B.

The third pixel P3 and the fourth pixel P4 have two common subpixels. For example, in the exemplary embodiment shown in FIG. 2, both the third pixel P3 and the fourth pixel P4 commonly include a yellow subpixel Y and a blue subpixel B.

In the pixel group PG, the number of first primary color components r, the number of second primary color components g, and the number of third primary color components b are substantially equal to each other. For example, the pixel group PG shown in FIG. 2 includes five first primary color components r, five second primary color components g, and five third primary color components b.

For example, in the pixel group PG, the number of first subpixels R including only the first primary color component r is three, and the number of fifth subpixels Y including the first and second primary color components r and g is two. As a result, the total number of first primary color components r in the pixel group PG is five.

Further, the number of second subpixels G including only the second primary color component g is two, the number of fourth subpixels C including the second and third primary color components g and b is one, and the number of fifth subpixels Y including the first and second primary color components r and g is two. As a result, the total number of second primary color components g in the pixel group PG is five.

Further, the number of third subpixels B including only the third primary color component b is four, and the number of fourth sub pixels C including the second and third primary color components g and b is one. As a result the total number of third primary color components b in the pixel group PG is five.

Therefore, the pixel group PG includes substantially the same number of first to third color components r, g and b. As a result, the display panel may display a desired color image.

In the exemplary embodiment shown in FIG. 2, each of the subpixels that are included in more than one pixel may be disposed in the same relative position in the first to fourth pixels P1 to P4 that include that subpixel. For example, the first subpixel R may be disposed in the same relative position in the first to fourth pixels P1 to P4. That is, the position of the first subpixel R in the first pixel P1 may be same as the position of the first subpixel R in the second pixel P2 and the position of the first subpixel R in the fourth pixel P4. Further, the second subpixel G may be disposed in the same relative position in the first to fourth pixels P1 to P4, the third subpixel B may be disposed in the same relative position in the first to fourth pixels P1 to P4, and the fifth subpixel Y may be disposed in the same relative position in the first to fourth pixels P1 to P4.

Figure 3:
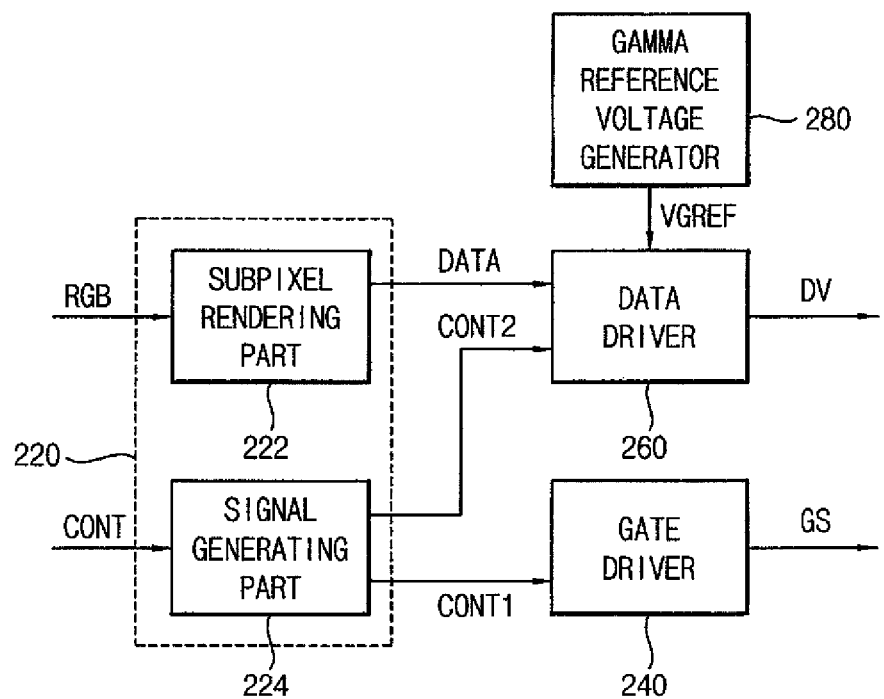
FIG. 3 is a block diagram illustrating a display panel driver of FIG. 1 according to an exemplary embodiment of the present invention.

FIG. 3 is a block diagram illustrating the display panel driver of FIG. 1 according to an exemplary embodiment of the present invention.

Referring to FIGS. 1 to 3, the display panel driver includes the timing controller 220, the gate driver 240, the data driver 260 and the gamma reference voltage generator 280.

The timing controller 220 includes a subpixel rendering part 222 and a signal generating part 224.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel C, and grayscale data for the fifth subpixel Y.

When the intensity of the primary color components in the pixel group PG are not uniform, the subpixel rendering part 222 may generate compensated grayscale data to improve color uniformity of an image.

For example, when the intensity of the first primary color component r is relatively less than the intensity of the other primary color components in the pixel group PG, the subpixel rendering part 222 may increase the grayscale data of the first primary color component r. Alternatively, when the intensity of the first primary color component r is relatively less than the intensity of the other primary color components in the pixel group PG, the subpixel rendering part 222 may decrease the grayscale data of the second and third primary color components g and b.

The subpixel rendering part 222 outputs the grayscale data DATA to the data driver 260.

The signal generating part 224 receives the input control signal CONT from an external apparatus. The input control signal CONT may include, for example, a master clock signal, a data enable signal, a vertical synchronizing signal and a horizontal synchronizing signal.

The signal generating part 224 generates a first control signal CONT1 that controls an operation of the gate driver 240 based on the input control signal CONT. The signal generating part 224 outputs the first control signal CONT1 to the gate driver 240. The first control signal CONT1 may include, for example, a vertical start signal and a gate clock signal.

The signal generating part 224 generates a second control signal CONT2 that controls an operation of the data driver 260 based on the input control signal CONT. The signal generating part 224 outputs the second control signal CONT2 to the data driver 260. The second control signal CONT2 may include, for example, a horizontal start signal and a load signal.

The timing controller 220 may further include an image compensating part that compensates the grayscale data DATA. The image compensating part may operate an adaptive color correction ("ACC") and a dynamic capacitance compensation ("DCC") to compensate the grayscale data DATA.

The gate driver 240 receives the first control signal CONT1 from the signal generating part 224. The gate driver 240 generates gate signals GS that drive the gate lines GL of the display panel 100 in response to the first control signal CONT1. The gate driver 240 sequentially outputs the gate signals GS to the gate lines of the display panel 100.

In an exemplary embodiment, the gate driver 240 may be directly mounted on the display panel 100. Alternatively, the gate driver 240 may be connected to the display panel 100 via a tape carrier package ("TCP"). Alternatively, the gate driver 240 may be integrated on the display panel 100.

The data driver 260 receives the second control signal CONT2 from the signal generating part 224 and the grayscale data DATA from the subpixel rendering part 222. The data driver 260 receives the gamma reference voltage VGREF from the gamma reference voltage generator 280.

The data driver 260 converts the grayscale data DATA into analog data voltages DV in response to the second control signal CONT2. The data driver 260 outputs the analog data voltages DV to the data lines DL of the display panel 100.

In an exemplary embodiment, the data driver 260 may be directly mounted on the display panel 100. Alternatively, the data driver 260 may be connected to the display panel 100 via a TCP. Alternatively, the data driver 260 may be integrated on the display panel 100.

According to the exemplary embodiment shown in FIG. 2, the display panel 100 may represent five primary colors using the pixels P1 to P4, each of which include three subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

Figure 4:
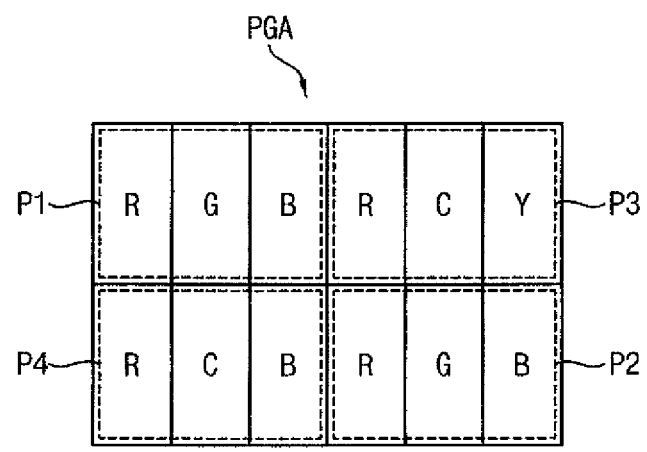
FIGS. 4 to 11 are plan views illustrating a pixel structure of the display panel of FIG. 1 according to exemplary embodiments of the present invention.

FIG. 4 is a plan view illustrating a pixel structure according to an exemplary embodiment of the present invention.

A display panel and a display apparatus according to the exemplary embodiment shown in FIG. 4 may be substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 4, the display apparatus includes a display panel 100 and a display panel driver.

The display panel 100 includes a plurality of pixel groups PGA. For example, the display panel 100 includes a plurality of pixel groups PGA disposed in a matrix form relative to the first direction D1 and the second direction D2.

In an exemplary embodiment, the pixel group PGA includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes three subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 4, the subpixels of the pixel group PGA may have one of five primary colors. That is, the pixel group PGA includes first to fifth subpixels having different colors from each other. Each of the first to fourth pixels P1 to P4 includes three of the first to fifth subpixels.

For example, the first subpixel may be a red subpixel R, the second subpixel may be a green subpixel G, the third subpixel may be a blue subpixel B, the fourth subpixel may be a cyan subpixel C, and the fifth subpixel may be a yellow subpixel Y.

The first subpixel R includes the first primary color component r, the second subpixel G includes the second primary color component g, the third subpixel B includes the third primary color component b, the fourth subpixel C includes the second and third primary color components g and b, and the fifth subpixel Y includes the first and second primary color components r and g.

A ratio between the second and third primary color components g and b in the fourth subpixel C may be substantially 1:1. A ratio between the first and second primary color components r and g in the fifth subpixel Y may be substantially 1:1.

The first pixel P1 includes a red subpixel R, a green subpixel G and a blue subpixel B. The second pixel P2 includes a red subpixel R, a green subpixel G and a blue subpixel B. The third pixel P3 includes a red subpixel R, a cyan subpixel C and a yellow subpixel Y. The fourth pixel P4 includes a red subpixel R, a cyan subpixel C and a blue subpixel B.

The third pixel P3 and the fourth pixel P4 have two common subpixels. For example, in the exemplary embodiment shown in FIG. 4, both the third pixel P3 and the fourth pixel P4 commonly include a red subpixel R and a cyan subpixel C.

In the pixel group PGA, the number of first primary color components r, the number of second primary color components g, and the number of third primary color components b are substantially equal to each other. For example, the pixel group PGA shown in FIG. 4 includes five first primary color components r, five second primary color components g, and five third primary color components b.

For example, in the pixel group PGA, the number of first subpixels R including only the first primary color component r is four, and the number of fifth subpixels Y including the first and second primary color components r and g is one. As a result, the total number of first primary color components r in the pixel group PGA is five.

Further, the number of second subpixels G including only the second primary color component g is two, the number of fourth subpixels C including the second and third primary color components g and b is two, and the number of fifth subpixels Y including the first and second primary color components r and g is one. As a result, the total number of second primary color components g in the pixel group PGA is five.

Further, the number of third subpixels B including only the third primary color component b is three, and the number of fourth subpixels C including the second and third primary color components g and b is two. As a result, the total number of third primary color components b in the pixel group PGA is five.

Therefore, the pixel group PGA includes substantially the same number of first to third color components r, g and b. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel C, and grayscale data for the fifth subpixel Y.

The subpixel rendering part 222 outputs the grayscale data DATA to the data driver 260.

According to the exemplary embodiment shown in FIG. 4, the display panel 100 may represent five primary colors using the pixels P1 to P4, each of which includes three subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

Figure 5:
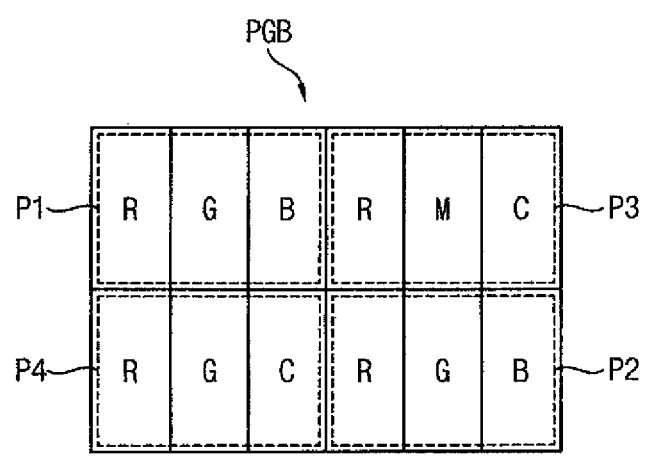

FIG. 5 is a plan view illustrating a pixel structure according to an exemplary embodiment of the present invention.

A display panel and a display apparatus according to the exemplary embodiment shown in FIG. 5 may be substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 5, the display apparatus includes a display panel 100 and a display panel driver.

The display panel 100 includes a plurality of pixel groups PGB. For example, the display panel 100 includes a plurality of pixel groups PGB disposed in a matrix form relative to the first direction D1 and the second direction D2.

In an exemplary embodiment, the pixel group PGB includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes three subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 5, the subpixels of the pixel group PGB may have one of five primary colors. That is, the pixel group PGB includes first to fifth subpixels having different colors from each other. Each of the first to fourth pixels P1 to P4 includes three of the first to fifth subpixels.

For example, the first subpixel may be a red subpixel R, the second subpixel may be a green subpixel G, the third subpixel may be a blue subpixel B, the fourth subpixel may be a magenta subpixel M, and the fifth subpixel may be a cyan subpixel C.

The first subpixel R includes the first primary color component r, the second subpixel G includes the second primary color component g, the third subpixel B includes the third primary color component b, the fourth subpixel M includes the first and third primary color components r and b, and the fifth subpixel C includes the second and third primary color components g and b.

A ratio between the first and third primary color components r and b in the fourth subpixel M may be substantially 1:1. A ratio between the second and third primary color components g and b in the fifth subpixel C may be substantially 1:1.

The first pixel P1 includes a red subpixel R, a green subpixel G and a blue subpixel B. The second pixel P2 includes a red subpixel R, a green subpixel G and a blue subpixel B. The third pixel P3 includes a red subpixel R, a magenta subpixel M and a cyan subpixel C. The fourth pixel P4 includes a red subpixel R, a green subpixel G and a cyan subpixel C.

The third pixel P3 and the fourth pixel P4 have two common subpixels. For example, in the exemplary embodiment shown in FIG. 5, both the third pixel P3 and the fourth pixel P4 commonly include a red subpixel R and a cyan subpixel C.

In the pixel group PGB, the number of first primary color components r, the number of second primary color components g and the number of third primary color components b are substantially equal to each other. For example, the pixel group PGB shown in FIG. 5 includes five first primary color components r, five second primary color components g, and five third primary color components b.

For example, in the pixel group PGB, the number of first subpixels R including only the first primary color component r is four, and the number of fourth subpixels M including the first and third primary color components r and b is one. As a result, the total number of first primary color components r in the pixel group PGB is five.

Further, the number of second subpixels G including only the second primary color component g is three, and the number of fifth subpixels C including the second and third primary color components g and b is two. As a result, the total number of second primary color components g in the pixel group PGB is five.

Further, the number of third subpixels B including only the third primary color component b is two, the number of fourth subpixels M including the first and third primary color components r and b is one, and the number of fifth subpixels C including the second and third primary color components g and b is two. As a result, the total number of third primary color components b in the pixel group PGB is five.

Therefore, the pixel group PGB includes substantially the same number of first to third color components r, g and b. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel grayscale data for the third subpixel B, grayscale data for the fourth subpixel M, and grayscale data for the fifth subpixel C.

The subpixel rendering part 222 outputs the grayscale data DATA to the data driver 260.

According to the exemplary embodiment shown in FIG. 5, the display panel 100 may represent five primary colors using the pixels P1 to P4, each of which includes three subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

Figure 6:
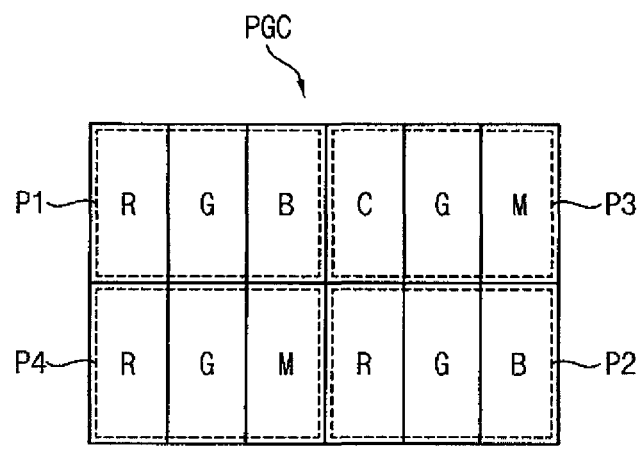

FIG. 6 is a plan view illustrating a pixel structure according to an exemplary embodiment of the present invention.

A display panel and a display apparatus according to the exemplary embodiment shown in FIG. 6 may be substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 6, the display apparatus includes a display panel 100 and a display panel driver.

The display panel 100 includes a plurality of pixel groups PGC. For example, the display panel 100 includes a plurality of pixel groups PGC disposed in a matrix form relative to the first direction D1 and the second direction D2.

In an exemplary embodiment, the pixel group PGC includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes three subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 6, the subpixels of the pixel group PGC may have one of five primary colors. That is, the pixel group PGC includes first to fifth subpixels having different colors from each other. Each of the first to fourth pixels P1 to P4 includes three of the first to fifth subpixels.

For example, the first subpixel may be a red subpixel R, the second subpixel may be a green subpixel G, the third subpixel may be a blue subpixel B, the fourth subpixel may be a magenta subpixel M, and the fifth subpixel may be a cyan subpixel C.

The first subpixel R includes the first primary color component r, the second subpixel G includes the second primary color component g, the third subpixel B includes the third primary color component b, the fourth subpixel M includes the first and third primary color components r and b, and the fifth subpixel C includes the second and third primary color components g and b.

A ratio between the first and third primary color components r and b in the fourth subpixel M may be substantially 1:1. A ratio between the second and third primary color components g and b in the fifth subpixel C may be substantially 1:1.

The first pixel P1 includes a red subpixel R, a green subpixel G and a blue subpixel B. The second pixel P2 includes a red subpixel R, a green subpixel G and a blue subpixel B. The third pixel P3 includes a cyan subpixel C, a green subpixel G and a magenta subpixel M. The fourth pixel P4 includes a red subpixel R, a green subpixel G and a magenta subpixel M.

The third pixel P3 and the fourth pixel P4 have two common subpixels. For example, in the exemplary embodiment shown in FIG. 6, both the third pixel P3 and the fourth pixel P4 commonly include a green subpixel G and a magenta subpixel M.

In the pixel group PGC, the number of first primary color components r, the number of second primary color components g and the number of third primary color components b are substantially equal to each other. For example, the pixel group PGC shown in FIG. 6 includes five first primary color components r, five second primary color components g, and five third primary color components b.

For example, in the pixel group PGC, the number of first subpixels R including only the first primary color component r is three, and the number of fourth subpixels M including the first and third primary color components r and b is two. As a result, the total number of first primary color components r in the pixel group PGC is five.

Further, the number of second subpixels G including only the second primary color component g is four, and the number of fifth subpixels C including the second and third primary color components g and b is one. As a result, the total number of second primary color components g in the pixel group PGC is five.

Further, the number of third subpixels B including only the third primary color component b is two, the number of fourth subpixels M including the first and third primary color components r and b is two, and the number of fifth subpixels C including the second and third primary color components g and b is one. As a result, the total number of third primary color components b in the pixel group PGC is five.

Therefore, the pixel group PGC includes substantially the same number of first to third color components r, g and b. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel M, and grayscale data for the fifth subpixel C.

The subpixel rendering part 222 outputs the grayscale data DATA to the data driver 260.

According to the exemplary embodiment shown in FIG. 6, the display panel 100 may represent five primary colors using the pixels P1 to P4, each of which includes three subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

Figure 7:
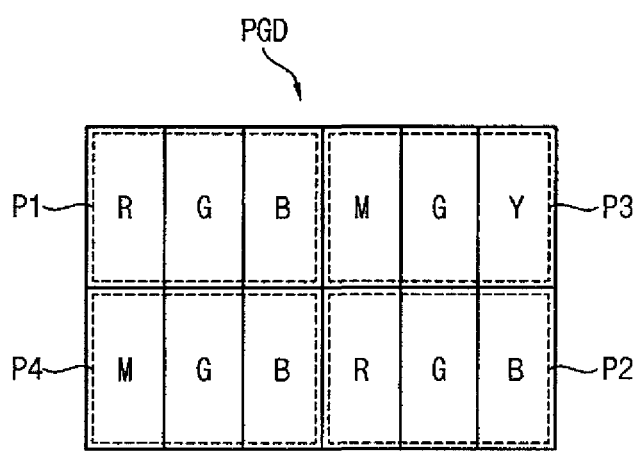

FIG. 7 is a plan view illustrating a pixel structure according to an exemplary embodiment of the present invention.

A display panel and a display apparatus according to the exemplary embodiment shown in FIG. 7 may be substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 7, the display apparatus includes a display panel 100 and a display panel driver.

The display panel 100 includes a plurality of pixel groups PGD. For example, the display panel 100 includes a plurality of pixel groups PGD disposed in a matrix form relative to the first direction D1 and the second direction D2.

In an exemplary embodiment, the pixel group PGD includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes three subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 7, the subpixels of the pixel group PGD may have one of five primary colors. That is, the pixel group PGD includes first to fifth subpixels having different colors from each other. Each of the first to fourth pixels P1 to P4 includes three of the first to fifth subpixels.

For example, the first subpixel may be a red subpixel R, the second subpixel may be a green subpixel G, the third subpixel may be a blue subpixel B, the fourth subpixel may be a magenta subpixel M, and the fifth subpixel may be a yellow subpixel Y.

The first subpixel R includes the first primary color component r, the second subpixel G includes the second primary color component g, the third subpixel B includes the third primary color component b, the fourth subpixel M includes the first and third primary color components r and b, and the fifth subpixel Y includes the first and second primary color components r and g.

A ratio between the first and third primary color components r and b in the fourth subpixel M may be substantially 1:1. A ratio between the first and second primary color components r and g in the fifth subpixel Y may be substantially 1:1.

The first pixel P1 includes a red subpixel R, a green subpixel G and a blue subpixel B. The second pixel P2 includes a red subpixel R, a green subpixel G and a blue subpixel B. The third pixel P3 includes a magenta subpixel M, a green subpixel G and a yellow subpixel Y. The fourth pixel P4 includes a magenta subpixel M, a green subpixel G and a blue subpixel B.

The third pixel P3 and the fourth pixel P4 have two common subpixels. For example, in the exemplary embodiment shown in FIG. 7, both the third pixel P3 and the fourth pixel P4 commonly include a magenta subpixel M and a green subpixel G.

In the pixel group PGD, the number of first primary color components r, the number of second primary color components g and the number of third primary color components b are substantially equal to each other. For example, the pixel group PGD shown in FIG. 7 includes five first primary color components r, five second primary color components g, and five third primary color components b.

For example, in the pixel group PGD, the number of first subpixels R including only the first primary color component r is two, the number of fourth subpixels M including the first and third primary color components r and b is two, and the number of fifth subpixels Y including the first and second primary color components r and g is one. As a result, the total number of first primary color components r in the pixel group PGD is five.

Further, the number of second subpixels G including only the second primary color component g is four, and the number of fifth subpixels Y including the first and second primary color components r and g is one. As a result, the total number of second primary color components g in the pixel group PGD is five.

Further, the number of third subpixels B including only the third primary color component b is three, and the number of fourth subpixels M including the first and third primary color components r and b is two. As a result, the total number of the third primary color components b in the pixel group PGD is five.

Therefore, the pixel group PGD includes substantially the same number of first to third color components r, g and b. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel M and grayscale data for the fifth subpixel Y.

The subpixel rendering part 222 outputs the grayscale data DATA to the data driver 260.

According to the exemplary embodiment shown in FIG. 7, the display panel 100 may represent five primary colors using the pixels P1 to P4, each of which includes three subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

Figure 8:
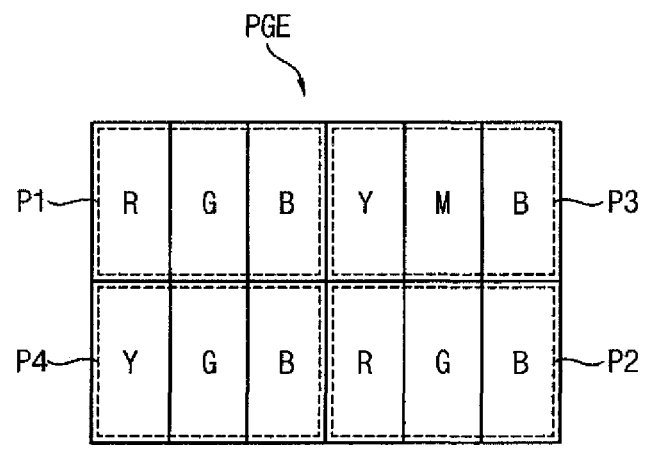

FIG. 8 is a plan view illustrating a pixel structure according to an exemplary embodiment of the present invention.

A display panel and a display apparatus according to the exemplary embodiment shown in FIG. 8 may be substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 8, the display apparatus includes a display panel 100 and a display panel driver.

The display panel 100 includes a plurality of pixel groups PGE. For example, the display panel 100 includes a plurality of pixel groups PGE disposed in a matrix form relative to the first direction D1 and the second direction D2.

In an exemplary embodiment, the pixel group PGE includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes three subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 8, the subpixels of the pixel group PGE may have one of five primary colors. That is, the pixel group PGE includes first to fifth subpixels having different colors from each other. Each of the first to fourth pixels P1 to P4 includes three of the first to fifth subpixels.

For example, the first subpixel may be a red subpixel R, the second subpixel may be a green subpixel G, the third subpixel may be a blue subpixel B, the fourth subpixel may be a magenta subpixel M, and the fifth subpixel may be a yellow subpixel Y.

The first subpixel R includes the first primary color component r, the second subpixel G includes the second primary color component g, the third subpixel B includes the third primary color component b, the fourth subpixel M includes the first and third primary color components r and b, and the fifth subpixel Y includes the first and second primary color components r and g.

A ratio between the first and third primary color components r and b in the fourth subpixel M may be substantially 1:1. A ratio between the first and second primary color components r and g in the fifth subpixel Y may be substantially 1:1.

The first pixel P1 includes a red subpixel R, a green subpixel G and a blue subpixel B. The second pixel P2 includes a red subpixel R, a green subpixel G and a blue subpixel B. The third pixel P3 includes a yellow subpixel Y, a magenta subpixel M and a blue subpixel B. The fourth pixel P4 includes a yellow subpixel Y, a green subpixel G and a blue subpixel B.

The third pixel P3 and the fourth pixel P4 have two common subpixels. For example, in the exemplary embodiment shown in FIG. 8, both the third pixel P3 and the fourth pixel P4 commonly include a yellow subpixel Y and a blue subpixel B.

In the pixel group PGE, the number of first primary color components r, the number of second primary color components g and the number of third primary color components b are substantially equal to each other. For example, the pixel group PGE shown in FIG. 8 includes five first primary color components r, five second primary color components g, and five third primary color components b.

For example, in the pixel group PGE, the number of first subpixels R including only the first primary color component r is two, the number of fourth subpixels M including the first and third primary color components r and b is one, and the number of fifth subpixels Y including the first and second primary color components r and g is two. As a result, the total number of first primary color components r in the pixel group PGE is five.

Further, the number of second subpixels G including only the second primary color component g is three, and the number of fifth subpixels Y including the first and second primary color components r and g is two. As a result, the total number of second primary color components g in the pixel group PGE is five.

Further, the number of third subpixels B including only the third primary color component b is four, and the number of fourth subpixels M including the first and third primary color components r and b is one. As a result, the total number of third primary color components b in the pixel group PGE is five.

Therefore, the pixel group PGE includes substantially the same number of first to third color components r, g and b. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel M and grayscale data for the fifth subpixel Y.

The subpixel rendering part 222 outputs the grayscale data DATA to the data driver 260.

According to the exemplary embodiment shown in FIG. 8, the display panel 100 may represent five primary colors using the pixels P1 to P4, each of which includes three subpixels. The display panel 100 is capable of representing a white image and a black image. Accordingly, the display panel 100 may represent a broad color gamut, may prevent a decrease of the resolution of the display panel 100. Thus, the display quality of the display apparatus may be improved.

Figure 9:
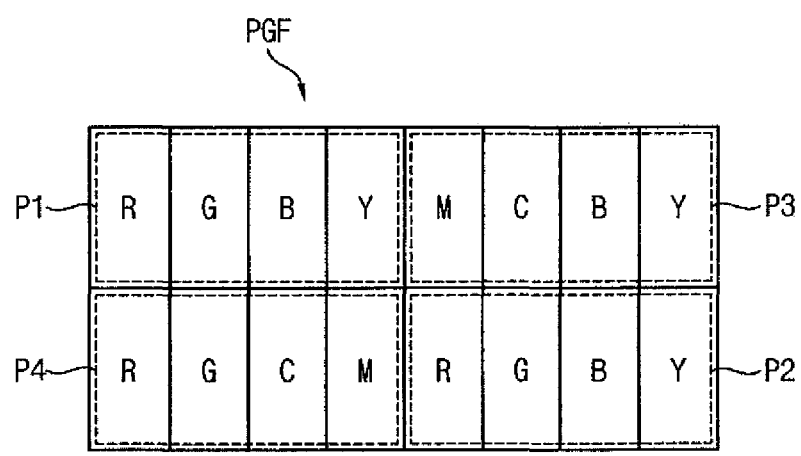

FIG. 9 is a plan view illustrating a pixel structure according to an exemplary embodiment of the present invention.

A display panel and a display apparatus according to the exemplary embodiment shown in FIG. 9 is substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 9, the display apparatus includes a display panel 100 and a display panel driver.

The display panel 100 includes a plurality of pixel groups PGF. For example, the display panel 100 includes a plurality of pixel groups PGF disposed in a matrix form relative to the first direction D1 and the second direction D2.

In an exemplary embodiment, the pixel group PGF includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes four subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 9, the subpixels of the pixel group PGF may have one of six primary colors. That is, the pixel group PGF includes first to sixth subpixels having different colors from each other. Each of the first to fourth pixels P1 to P4 includes four of the first to sixth subpixels.

For example, the first subpixel may be a red subpixel R, the second subpixel may be a green subpixel G, the third subpixel may be a blue subpixel B, the fourth subpixel may be a cyan subpixel C, the fifth subpixel may be a magenta subpixel M, and the sixth subpixel may be a yellow subpixel Y.

The first subpixel R includes the first primary color component r, the second subpixel G includes the second primary color component g, the third subpixel B includes the third primary color component b, the fourth subpixel C includes the second and third primary color components g and b, the fifth subpixel M includes the first and third primary color components r and b, and the sixth subpixel Y includes the first and second primary color components r and g.

A ratio between the second and third primary color components g and b in the fourth subpixel C may be substantially 1:1. A ratio between the first and third primary color components r and b in the fifth subpixel M may be substantially 1:1. A ratio between the first and second primary color components r and g in the sixth subpixel Y may be substantially 1:1.

In the exemplary embodiment shown in FIG. 9, the pixel group PGF includes sixteen total subpixels. The pixel group PGF includes three first subpixels R, three second subpixels G, and three third subpixels B. The pixel group PGF includes two fourth subpixels C, two fifth subpixels M, and three sixth subpixels Y.

The first pixel P1 includes a red subpixel R, a green subpixel G, a blue subpixel B and a yellow subpixel Y. The second pixel P2 includes a red subpixel R, a green subpixel G, a blue subpixel B and a yellow subpixel Y. The third pixel P3 includes a magenta subpixel M, a cyan subpixel C, a blue subpixel B and a yellow subpixel Y. The fourth pixel P4 includes a red subpixel R, a green subpixel G, a cyan subpixel C and a magenta subpixel M.

The third pixel P3 and the fourth pixel P4 have two common subpixels. For example, in the exemplary embodiment shown in FIG. 9, both the third pixel P3 and the fourth pixel P4 commonly include a magenta subpixel M and a cyan subpixel C.

In the pixel group PGF, the difference between any two of the number of first primary color components r, the number of second primary color components g, and the number of third primary color components b is less than or equal to one. For example, in the pixel group PGF shown in FIG. 9, the number of first primary color components r is eight, the number of second primary color components g is eight, and the number of third primary color components b is seven.

For example, in the pixel group PGF, the number of first subpixels R including only the first primary color component r is three, the number of fifth subpixels M including the first and third primary color components r and b is two, and the number of sixth subpixels Y including the first and second primary color components r and g is three. As a result, the total number of first primary color components r in the pixel group PGF is eight.

Further, the number of second subpixels G including only the second primary color component g is three, the number of fourth subpixels C including the second and third primary color components g and b is two, and the number of sixth subpixels Y including the first and second primary color components r and g is three. As a result, the total number of second primary color components g in the pixel group PGF is eight.

Further, the number of third subpixels B including only the third primary color component b is three, the number of fourth subpixels C including the second and third primary color components g and b is two, and the number of fifth subpixels M including the first and third primary color components r and b is two. As a result, the total number of third primary color components b in the pixel group PGF is seven.

Therefore, in the pixel group PGF, the difference between any two of the first to third color components r, g and b is within one. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel C, grayscale data for the fifth subpixel M and grayscale data for the sixth subpixel Y.

When the primary color components in the pixel group PGF are not uniform, the subpixel rendering part 222 may generate compensated grayscale data to improve color uniformity of an image.

For example, when the intensity of the third primary color component b is less than the first and second primary color components r and g in the pixel group PGF, the subpixel rendering part 222 may increase the grayscale data of the third primary color component b. Alternatively, when the intensity of the third primary color component b is less than the first and second primary color components r and g in the pixel group PGF, the subpixel rendering part 222 may decrease the grayscale data of the first and second primary color components r and g.

The subpixel rendering part 222 outputs the grayscale data DATA to the data driver 260.

According to the exemplary embodiment shown in FIG. 9, the display panel 100 may represent six primary colors using the pixels P1 to P4, each of which includes four subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

Figure 10:
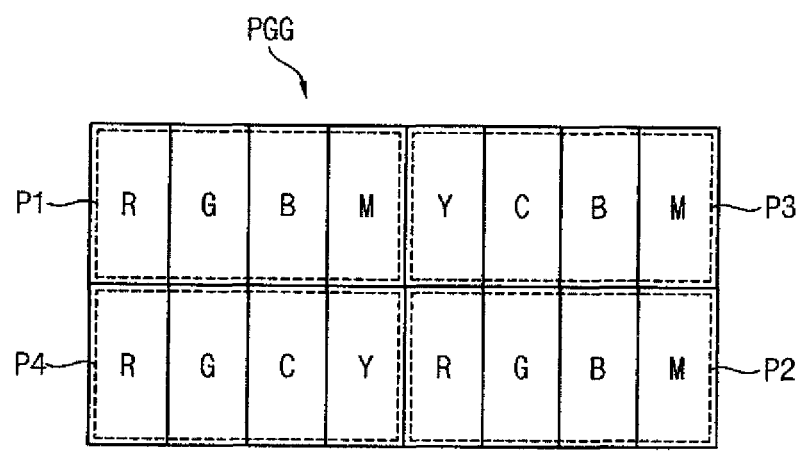

FIG. 10 is a plan view illustrating a pixel structure according to an exemplary embodiment of the present invention.

A display panel and a display apparatus according to the exemplary embodiment shown in FIG. 10 is substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 10, the display apparatus includes a display panel 100 and a display panel driver.

The display panel 100 includes a plurality of pixel groups PGG. For example, the display panel 100 includes a plurality of pixel groups PGG disposed in a matrix form relative to the first direction D1 and the second direction D2.

In an exemplary embodiment, the pixel group PGG includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes four subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 10, the subpixels of the pixel group PGG may have one of six primary colors. That is, the pixel group PGG includes first to sixth subpixels having different colors from each other. Each of the first to fourth pixels P1 to P4 includes four of the first to sixth subpixels.

For example, the first subpixel may be a red subpixel R, the second subpixel may be a green subpixel G, the third subpixel may be a blue subpixel B, the fourth subpixel may be a cyan subpixel C, the fifth subpixel may be a magenta subpixel M, and the sixth subpixel may be a yellow subpixel Y.

The first subpixel R includes the first primary color component r, the second subpixel G includes the second primary color component g, the third subpixel B includes the third primary color component b, the fourth subpixel C includes the second and third primary color components g and b, the fifth subpixel M includes the first and third primary color components r and b, and the sixth subpixel Y includes the first and second primary color components r and g.

A ratio between the second and third primary color components g and b in the fourth subpixel C may be substantially 1:1. A ratio between the first and third primary color components r and b in the fifth subpixel M may be substantially 1:1. A ratio between the first and second primary color components r and g in the sixth subpixel Y may be substantially 1:1.

The first pixel P1 includes a red subpixel R, a green subpixel G, a blue subpixel B and a magenta subpixel M. The second pixel P2 includes a red subpixel R, a green subpixel G, a blue subpixel B and a magenta subpixel M. The third pixel P3 includes a yellow subpixel Y, a cyan subpixel C, a blue subpixel B and a magenta subpixel M. The fourth pixel P4 includes a red subpixel R, a green subpixel G, a cyan subpixel C and a yellow subpixel Y.

The third pixel P3 and the fourth pixel P4 have two common subpixels. For example, in the exemplary embodiment shown in FIG. 10, both the third pixel P3 and the fourth pixel P4 commonly include a cyan subpixel C and a yellow subpixel Y.

In the pixel group PGG, the difference between any two of the number of first primary color components r, the number of second primary color components g, and the number of third primary color components b is less than or equal to one. For example, in the pixel group PGG shown in FIG. 10, the number of first primary color components r is eight, the number of second primary color components g is seven, and the number of third primary color components b is eight.

For example, in the pixel group PGG, the number of first subpixels R including only the first primary color component r is three, the number of fifth subpixels M including the first and third primary color components r and b is three, and the number of sixth subpixels Y including the first and second primary color components r and g is two. As a result, the total number of first primary color components r in the pixel group PGG is eight.

Further, the number of second subpixels G including only the second primary color component g is three, the number of fourth subpixels C including the second and third primary color components g and b is two, and the number of sixth subpixels Y including the first and second primary color components r and g is two. As a result, the total number of second primary color components g in the pixel group PGG is seven.

Further, the number of third subpixels B including only the third primary color component b is three, the number of fourth subpixels C including the second and third primary color components g and b is two, and the number of fifth subpixels M including the first and third primary color components r and b is three. As a result, the total number of third primary color components b in the pixel group PGG is eight.

Therefore, in the pixel group PGG, the difference between any two of the first to third color components r, g and b is within one. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel C, grayscale data for the fifth subpixel M and grayscale data for the sixth subpixel Y.

When the primary color components in the pixel group PGG are not uniform, the subpixel rendering part 222 may generate compensated grayscale data to improve color uniformity of an image.

For example, when the intensity of the second primary color component g is less than the first and third primary color components r and b in the pixel group PGG, the subpixel rendering part 222 may increase the grayscale data of the second primary color component g. Alternatively, when the intensity of the second primary color component g is less than the first and third primary color components r and b in the pixel group PGG, the subpixel rendering part 222 may decrease the grayscale data of the first and third primary color components r and b.

The subpixel rendering part 222 outputs the grayscale data DATA to the data driver 260.

According to the exemplary embodiment shown in FIG. 10, the display panel 100 may represent six primary colors using the pixels P1 to P4, each of which includes four subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

Figure 11:
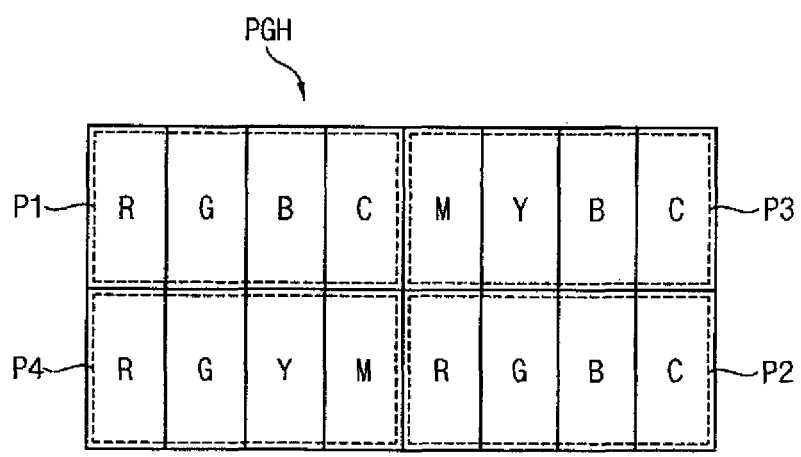

FIG. 11 is a plan view illustrating a pixel structure according to an exemplary embodiment of the present invention.

A display panel and a display apparatus according to the exemplary embodiment shown in FIG. 11 is substantially the same as the display panel and the display apparatus described with reference to FIGS. 1 to 3, except for a pixel structure of the display panel. Thus, the same reference numerals may be used to refer to the same or like elements as those described with reference to FIGS. 1 to 3, and further description of these elements may be omitted.

Referring to FIGS. 1 and 11, the display apparatus includes a display panel 100 and a display panel driver.

The display panel 100 includes a plurality of pixel groups PGH. For example, the display panel 100 includes a plurality of pixel groups PGH disposed in a matrix form relative to the first direction D1 and the second direction D2.

In an exemplary embodiment, the pixel group PGH includes a first pixel P1, a second pixel P2, a third pixel P3 and a fourth pixel P4. The first to fourth pixels P1 to P4 are disposed in a two-by-two matrix form. For example, the first pixel P1 and the second pixel P2 may be disposed in a diagonal direction, the third pixel P3 may be disposed adjacent to the first pixel P1 in the first direction D1, and the fourth pixel P4 may be disposed adjacent to the first pixel P1 in the second direction D2.

Each of the first to fourth pixels P1 to P4 includes four subpixels.

Each of the first to fourth pixels P1 to P4 is capable of representing a white image and a black image. Each of the first to fourth pixels P1 to P4 includes a first primary color component, a second primary color component and a third primary color component. For example, the first primary color component may be red, the second primary color component may be green, and the third primary color component may be blue.

In the exemplary embodiment shown in FIG. 11, the subpixels of the pixel group PGH may have one of six primary colors. That is, the pixel group PGH includes first to sixth subpixels having different colors from each other. Each of the first to fourth pixels P1 to P4 includes four of the first to sixth subpixels.

For example, the first subpixel may be a red subpixel R, the second subpixel may be a green subpixel G, the third subpixel may be a blue subpixel B, the fourth subpixel may be a cyan subpixel C, the fifth subpixel may be a magenta subpixel M, and the sixth subpixel may be a yellow subpixel Y.

The first subpixel R includes the first primary color component r, the second subpixel G includes the second primary color component g, the third subpixel B includes the third primary color component b, the fourth subpixel C includes the second and third primary color components g and b, the fifth subpixel M includes the first and third primary color components r and b, and the sixth subpixel Y includes the first and second primary color components r and g.

A ratio between the second and third primary color components g and b in the fourth subpixel C may be substantially 1:1. A ratio between the first and third primary color components r and b in the fifth subpixel M may be substantially 1:1. A ratio between the first and second primary color components r and g in the sixth subpixel Y may be substantially 1:1.

The first pixel P1 includes a red subpixel R, a green subpixel G, a blue subpixel B and a cyan subpixel C. The second pixel P2 includes a red subpixel R, a green subpixel G, a blue subpixel B and a cyan subpixel C. The third pixel P3 includes a magenta subpixel M, a yellow subpixel Y, a blue subpixel B and a cyan subpixel C. The fourth pixel P4 includes a red subpixel R, a green subpixel G, a yellow subpixel Y and a magenta subpixel M.

The third pixel P3 and the fourth pixel P4 have two common subpixels. For example, in the exemplary embodiment shown in FIG. 11, both the third pixel P3 and the fourth pixel P4 commonly include a magenta subpixel M and a yellow subpixel Y.

In the pixel group PGH, the difference between any two of the number of first primary color components r, the number of second primary color components g and the number of third primary color components b is less than or equal to one. For example, in the pixel group PGH shown in FIG. 11, the number of first primary color components r is seven, the number of second primary color components g is eight, and the number of third primary color components b is eight.

For example, in the pixel group PGH, the number of first subpixels R including only the first primary color component r is three, the number of fifth subpixels M including the first and third primary color components r and b is two, and the number of sixth subpixels Y including the first and second primary color components r and g is two. As a result, the total number of first primary color components r in the pixel group PGH is seven.

Further, the number of second subpixels G including only the second primary color component g is three, the number of fourth subpixels C including the second and third primary color components g and b is three, and the number of sixth subpixels Y including the first and second primary color components r and g is two. As a result, the total number of second primary color components g in the pixel group PGH is eight.

Further, the number of third subpixels B including only the third primary color component b is three, the number of fourth subpixels C including the second and third primary color components g and b is three, and the number of fifth subpixels M including the first and third primary color components r and b is two. As a result, the total number of third primary color components b in the pixel group PGH is eight.

Therefore, in the pixel group PGH, the difference between any two of the first to third color components r, g and b is within one. As a result, the display panel may display a desired color image.

The display panel driver includes the timing controller 220, the gate driver 240, the data driver 260, and the gamma reference voltage generator 280, as shown in FIG. 1.

The timing controller 220 includes a subpixel rendering part 222 and a signal generating part 224, as shown in FIG. 3.

The subpixel rendering part 222 receives the input image data RGB from an external apparatus. The input image data RGB may include red image data R, green image data G and blue image data B.

The subpixel rendering part 222 generates grayscale data DATA of the subpixel as the data signal DATA based on the input image data RGB. For example, the subpixel rendering part 222 independently generates grayscale data for the first subpixel R, grayscale data for the second subpixel G, grayscale data for the third subpixel B, grayscale data for the fourth subpixel C, grayscale data for the fifth subpixel M and grayscale data for the sixth subpixel Y.

When the primary color components in the pixel group PGH are not uniform, the subpixel rendering part 222 may generate compensated grayscale data to improve color uniformity of an image.

For example, when the intensity of the first primary color component r is less than the second and third primary color components g and b in the pixel group PGH, the subpixel rendering part 222 may increase the grayscale data of the first primary color component r. Alternatively, when the intensity of the first primary color component r is less than the second and third primary color components g and b in the pixel group PGH, the subpixel rendering part 222 may decrease the grayscale data of the second and third primary color components g and b.

The subpixel rendering part 222 outputs the grayscale data DATA to the data driver 260.

According to the exemplary embodiment shown in FIG. 11, the display panel 100 may represent six primary colors using the pixels P1 to P4, each of which includes four subpixels. The display panel 100 is capable of representing a white image and a black image. Accordingly, the display panel 100 may represent a broad color gamut, may prevent a decrease of the resolution of the display panel 100, and may prevent a decrease of the aperture ratio of the display panel 100. Thus, the display quality of the display apparatus may be improved.

According to exemplary embodiments of the present invention as described above, the display panel may represent a broader color gamut, and the display quality of the display apparatus may be improved.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display panel, comprising:
    a pixel group comprising no more than a first pixel, a second pixel, a third pixel, and a fourth pixel,
    wherein the first to fourth pixels are disposed in a two-by-two matrix form,
    each of the first to fourth pixels comprises at least three subpixels from among a plurality of subpixels in the pixel group,
    a subpixel layout of the second pixel is a same as a subpixel layout of the first pixel,
    a subpixel layout of the third pixel is different from the subpixel layout of the first pixel, and
    a subpixel layout of the fourth pixel is different from the subpixel layout of the first pixel and the subpixel layout of the third pixel,
    wherein the pixel group is one of a plurality of pixel groups, each pixel group including no more than the first to fourth pixels, and the pixel groups are repetitively disposed in a matrix form relative to a first direction and a second direction.

2. The display panel of claim 1, wherein each of the first to fourth pixels comprises at least one first primary color component, at least one second primary color component, and at least one third primary color component.

3. The display panel of claim 2, wherein the first primary color component is red, the second primary color component is green, and the third primary color component is blue.

4. The display panel of claim 1, wherein the first pixel and the second pixel are disposed in a diagonal direction in the two-by-two matrix form.

5. The display panel of claim 1, wherein the third pixel and the fourth pixel comprise two common subpixels.

6. The display panel of claim 1, wherein each of the first to fourth pixels comprises three subpixels from the plurality of subpixels, and the plurality of subpixels comprises five different primary colors.

7. The display panel of claim 6, wherein each of the plurality of subpixels comprises at least one of three different primary color components, and
    a number of first primary color components in the pixel group, a number of second primary color components in the pixel group, and a number of third primary color components in the pixel group are substantially equal to each other.

8. The display panel of claim 7, wherein the number of first primary color components in the pixel group is five, the number of second primary color components in the pixel group is five, and the number of third primary color components in the pixel group is five.

9. The display panel of claim 7, wherein the first pixel comprises a first red subpixel, a first green subpixel and a first blue subpixel,
    the second pixel comprises a second red subpixel, a second green subpixel and a second blue subpixel,
    the third pixel comprises a cyan subpixel, a first yellow subpixel and a third blue subpixel, and
    the fourth pixel comprises a third red subpixel, a second yellow subpixel and a fourth blue subpixel.

10. The display panel of claim 7, wherein the first pixel comprises a first red subpixel, a first green subpixel and a first blue subpixel,
    the second pixel comprises a second red subpixel, a second green subpixel and a second blue subpixel,
    the third pixel comprises a third red subpixel, a first cyan subpixel and a yellow subpixel, and
    the fourth pixel comprises a fourth red subpixel, a second cyan subpixel and a third blue subpixel.

11. The display panel of claim 7, wherein the first pixel comprises a first red subpixel, a first green subpixel and a first blue subpixel,
    the second pixel comprises a second red subpixel, a second green subpixel and a second blue subpixel,
    the third pixel comprises a third red subpixel, a magenta subpixel and a first cyan subpixel, and
    the fourth pixel comprises a fourth red subpixel, a third green subpixel and a second cyan subpixel.

12. The display panel of claim 7, wherein the first pixel comprises a first red subpixel, a first green subpixel and a first blue subpixel, the second pixel comprises a second red subpixel, a second green subpixel and a second blue subpixel, the third pixel comprises a cyan subpixel, a third green subpixel and a first magenta subpixel, and the fourth pixel comprises a third red subpixel, a fourth green subpixel and a second magenta subpixel.

13. The display panel of claim 7, wherein the first pixel comprises a first red subpixel, a first green subpixel and a first blue subpixel, the second pixel comprises a second red subpixel, a second green subpixel and a second blue subpixel, the third pixel comprises a first magenta subpixel, a third green subpixel and a yellow subpixel, and the fourth pixel comprises a second magenta subpixel, a fourth green subpixel and a third blue subpixel.

14. The display panel of claim 7, wherein the first pixel comprises a first red subpixel, a first green subpixel and a first blue subpixel, the second pixel comprises a second red subpixel, a second green subpixel and a second blue subpixel, the third pixel comprises a first yellow subpixel, a magenta subpixel and a third blue subpixel, and the fourth pixel comprises a second yellow subpixel, a third green subpixel and a fourth blue subpixel.

15. The display panel of claim 1, wherein each of the first to fourth pixels comprises four subpixels from the plurality of subpixels, and the plurality of subpixels comprises six different primary colors.

16. The display panel of claim 15, wherein each of the first to fourth pixels comprises at least one first primary color component, at least one second primary color component, and at least one third primary color component, and a difference between two of a number of first primary color components in the pixel group, a number of second primary color components in the pixel group, and a number of third primary color components in the pixel group is less than or equal to one.

17. The display panel of claim 16, wherein two of the number of the first, second and third primary color components is eight, and one of the number of the first, second and third primary color components is seven.

18. The display panel of claim 16, wherein the first pixel comprises a first red subpixel, a first green subpixel, a first blue subpixel and a first yellow subpixel, the second pixel comprises a second red subpixel, a second green subpixel, a second blue subpixel and a second yellow subpixel, the third pixel comprises a first magenta subpixel, a first cyan subpixel, a third blue subpixel and a third yellow subpixel, and the fourth pixel comprises a third red subpixel, a third green subpixel, a second cyan subpixel and a second magenta subpixel.

19. The display panel of claim 16, wherein the first pixel comprises a first red subpixel, a first green subpixel, a first blue subpixel and a first magenta subpixel, the second pixel comprises a second red subpixel, a second green subpixel, a second blue subpixel and a second magenta subpixel, the third pixel comprises a first yellow subpixel, a first cyan subpixel, a third blue subpixel and a third magenta subpixel, and the fourth pixel comprises a third red subpixel, a third green subpixel, a second cyan subpixel and a second yellow subpixel.

20. The display panel of claim 16, wherein the first pixel comprises a first red subpixel, a first green subpixel, a first blue subpixel and a first cyan subpixel, the second pixel comprises a second red subpixel, a second green subpixel, a second blue subpixel and a second cyan subpixel, the third pixel comprises a first magenta subpixel, a first yellow subpixel, a third blue subpixel and a third cyan subpixel, and the fourth pixel comprises a third red subpixel, a third green subpixel, a second yellow subpixel and a second magenta subpixel.

21. A display apparatus, comprising:

a display panel comprising a pixel group, wherein the pixel group comprises no more than a first pixel, a second pixel, a third pixel and a fourth pixel; and a display panel driver operatively coupled to the display panel and configured to operate a subpixel rendering independently for subpixels of the display panel according to colors of the subpixels, wherein the first to fourth pixels are disposed in a two-by-two matrix form, each of the first to fourth pixels comprises at least three subpixels of the display panel, a subpixel layout of the second pixel is a same as a subpixel layout of the first pixel, a subpixel layout of the third pixel is different from the subpixel layout of the first pixel, and a subpixel layout of the fourth pixel is different from the subpixel layout of the first pixel and the subpixel layout of the third pixel, wherein the pixel group is one of a plurality of pixel groups, each pixel group including no more than the first to fourth pixels, and the pixel groups are repetitively disposed in a matrix form relative to a first direction and a second direction.

* * * * *